United States Patent
Yamauchi et al.

(10) Patent No.: US 7,842,118 B2
(45) Date of Patent: *Nov. 30, 2010

(54) RECYCLING METHOD FOR SCRAP SILICON

(75) Inventors: Norichika Yamauchi, Ichihara (JP); Takehiko Shimada, Yokohama (JP)

(73) Assignee: IIS Materials Corporation, Ltd., Tokyo (JP)

( * ) Notice: Subject to any disclaimer, the term of this patent is extended or adjusted under 35 U.S.C. 154(b) by 645 days.

This patent is subject to a terminal disclaimer.

(21) Appl. No.: 11/142,659

(22) Filed: Jun. 2, 2005

(65) Prior Publication Data

US 2006/0016289 A1    Jan. 26, 2006

(30) Foreign Application Priority Data

Jun. 3, 2004    (JP)    ............................. 2004-194723

(51) Int. Cl.
  *C22B 9/22* (2006.01)
(52) U.S. Cl. ........................................ 75/10.13; 75/10.1
(58) Field of Classification Search ....... 75/10.1–10.67; C01B 33/037, 33/039
See application file for complete search history.

(56) References Cited

U.S. PATENT DOCUMENTS

| | | | | |
|---|---|---|---|---|
| 3,442,622 A | * | 5/1969 | Monnier et al. | ............. 423/348 |
| 5,961,944 A | * | 10/1999 | Aratani et al. | .............. 423/348 |
| 6,036,932 A | * | 3/2000 | Hongu et al. | ............... 423/348 |
| 6,090,361 A | * | 7/2000 | Baba et al. | .................. 423/350 |
| 6,231,826 B1 | * | 5/2001 | Hanazawa et al. | .......... 423/348 |

FOREIGN PATENT DOCUMENTS

JP    10245216    9/1998

OTHER PUBLICATIONS

Peter L. Swan, Alcoa: The Influence of Recycling on Monopoly Power, The Journal of Political Economy, vol. 88, No. 1, Feb. 1980, pp. 76-99 (most relevant pp. 80-82).*
Computer-generated translation of JP 10-245216, published in the Japanese language on Sep. 1998.*

* cited by examiner

*Primary Examiner*—Scott Kastler
*Assistant Examiner*—Vanessa Velasquez
(74) *Attorney, Agent, or Firm*—Michael Tobias

(57) ABSTRACT

Scrap silicon from which a profit can be obtained taking into consideration the purchase price and refining cost of scrap silicon and the expected sale price of silicon products is selectively recovered, the recovered scrap silicon is refined, and silicon which can be sold as a silicon product is manufactured.

5 Claims, 2 Drawing Sheets

RECYCLING METHOD FOR SCRAP SILICON

BACKGROUND OF THE INVENTION

This invention relates to a recycling method for scrap silicon which can manufacture high-purity silicon from scrap silicon which contains impurity elements as dopants and which is produced during the manufacture of silicon products such as silicon wafers.

In order to increase the rate of utilization of silicon raw materials, it is desired to reutilize scrap which is produced during the manufacture of silicon wafers from silicon ingots (referred to below as "scrap silicon"). However, scrap silicon contains impurities, so it is necessary to increase its purity before it can be reused.

Japanese Published Unexamined Patent Application Hei 10-245216 discloses that the yield of silicon can be increased by recovering scrap silicon which is produced during the manufacture of silicon for solar cells and returning the recovered scrap silicon to a refining step.

However, that publication merely discloses a technique for increasing the yield of silicon in the manufacture of silicon for solar cells.

SUMMARY OF THE INVENTION

The present invention provides a method of recycling scrap silicon which is produced during the manufacture of silicon products such as silicon wafers as a business.

Scrap silicon which is produced during the manufacture of silicon products contains various impurity elements such as boron, phosphorus, arsenic, and antimony. Of these impurity elements, boron, for example, has low activity, and removal thereof by vaporization is difficult (its vapor pressure is low, so simple vacuum removal cannot be performed). In addition, its segregation coefficient is small, so refining by solidification is not practical. Accordingly, even if scrap silicon containing boron as a dopant is recovered, it is not possible to recycle it, and even if refining is possible, it cannot be done profitably due to refining costs, so it cannot be carried out as a money-making business.

In light of the above-described problems, the present invention provides a recycling method for scrap silicon which can be performed profitably as a business. Scrap silicon from which a profit can be obtained is selectively recovered taking into consideration the purchase price and refining costs of scrap silicon and the expected sale price of silicon products, and the recovered scrap silicon is refined so as to reduce an impurity element contained in the recovered scrap silicon as a dopant to a desired level to thereby manufacture a silicon product which can be sold as a silicon material (hereinafter may be referred to as "product silicon"). "Scrap silicon from which a profit can be obtained" refers to scrap silicon for which the expected sale price of the resulting silicon product exceeds the total of the purchase price and refining cost of the scrap silicon.

The desired level to which the impurity element is reduced is determined on the basis of the required purity of the product silicon. For example, when the product silicon is used as a material for solar cells, the desired level is such that the product silicon will have a purity of 99.999%, which however varies depending on the type of the impurity element contained as a dopant.

It is preferable to selectively recover only n-type scrap silicon containing arsenic, antimony, or phosphorus as a dopant. Of this n-type scrap silicon, it is preferable to selectively recover only n-type scrap silicon containing arsenic or antimony, since these elements can be easily vaporized (easily removed by evaporative removal). Next in preference is n-type scrap silicon containing phosphorus as a dopant. It is preferable to manufacture product silicon by placing the recovered scrap silicon into a vacuum vessel, irradiating the scrap silicon with an electron beam to melt the scrap silicon and perform evaporative removal of the impurity element so as to vaporize at least a portion of the impurity element and reduce the level of the impurity element, and solidifying the resulting molten silicon.

Antimony and arsenic have a high vapor pressure in a vacuum, so by using the above-described refining method, product silicon of high purity can be manufactured at a relatively low cost from scrap silicon containing either of these as a dopant, and a business of high profitability can be established.

In a recycling method for scrap silicon according to the present invention, only scrap silicon from which a profit can be obtained taking into consideration the purchase cost and refining cost of scrap silicon and the expected sale price of silicon products is selectively recovered and refined to manufacture product silicon. Therefore, not only can the present invention respond to the demand of industry to reutilize scrap silicon which is produced during the manufacture of silicon wafers, but it can also carry out recycling of scrap silicon as a profitable business.

DESCRIPTION OF PREFERRED EMBODIMENTS

Below, an embodiment of a recycling method for scrap silicon according to the present invention will be described while referring to the accompanying drawings.

Figure 1:
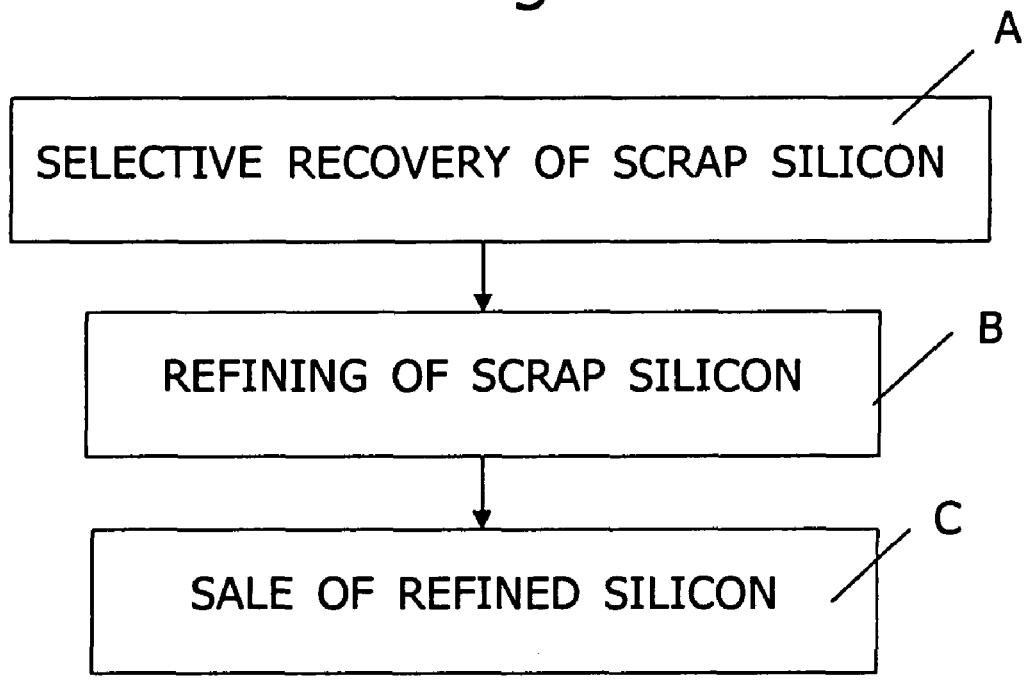
FIG. 1 is a flow chart of the steps in an embodiment of a recycling method for scrap silicon according to the present invention.
Figure 2:
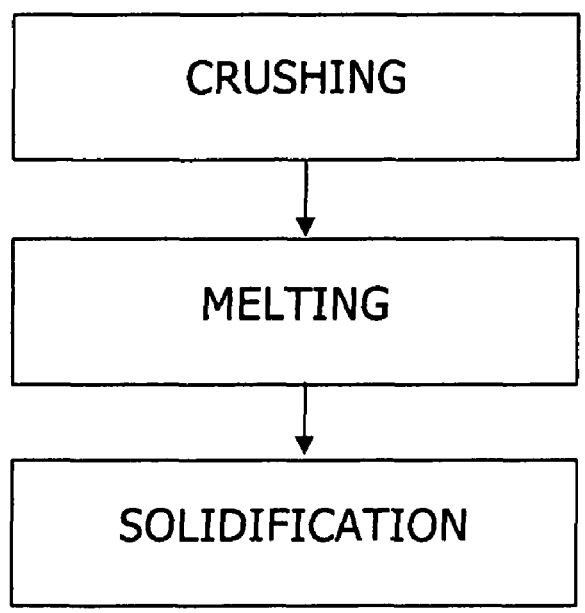
FIG. 2 is a flow chart of the steps in an electron beam refining method used in an embodiment of a recycling method for scrap silicon according to the present invention.

As shown in FIG. 1, this embodiment of a recycling method for scrap silicon according to the present invention includes Step A in which only scrap silicon from which a profit can be obtained is selectively recovered, Step B in which the recovered scrap silicon is refined and product silicon is manufactured, and Step C in which the manufactured product silicon is sold. Next, the recovery step (Step A) and the manufacturing (refining) step (Step B) will be described in detail.

Step A (Recovery Step)

First, scrap silicon from which a profit can be obtained is selected based on the purchase price and refining cost of scrap silicon and the sale price of silicon products Specifically, a refining method suitable for the impurity elements contained in scrap silicon (the method which can perform refining at the lowest cost) is selected, and the refining cost when utilizing the selected refining method is estimated. Then, profitability is determined based on the estimated refining costs, the purchase price of scrap silicon, and the sale price of silicon products. For example, when only n-type scrap silicon containing antimony, arsenic, or phosphorus is purchased from manufacturers or obtained by grading of various types of scrap silicon (both methods collectively referred to below as "recovery"), and the recovered scrap silicon is refined by the below-described refining method using an electron beam, an adequate profit can be obtained, although the profit varies with the purchase price of scrap silicon and sale price of product silicon. In particular, antimony and arsenic have a high vapor pressure in a vacuum, so they can be efficiently removed by the below-described refining method using an electron beam. Therefore, it is preferable to selectively recover scrap silicon containing antimony or arsenic as a dopant. An example of a suitable method of selectively recovering scrap silicon which contains a specific element (antimony or arsenic) as a dopant is disclosed in U.S. patent application Ser. No. 11/142,679 by Yamauchi et al. entitled "Method of Refining Scrap Silicon using an Electron Beam", now U.S. Pat. No. 7,632,329, the disclosure of which is incorporated by reference.

Step B (Manufacturing (Refining) Step)

The scrap silicon which was selectively recovered in the above-described manner in Step A is refined using an electron beam. The refining method which is employed in this embodiment comprises a crushing step, a melting step, and a solidification step. These steps will be described below in sequence.

Crushing Step

Figure 3:
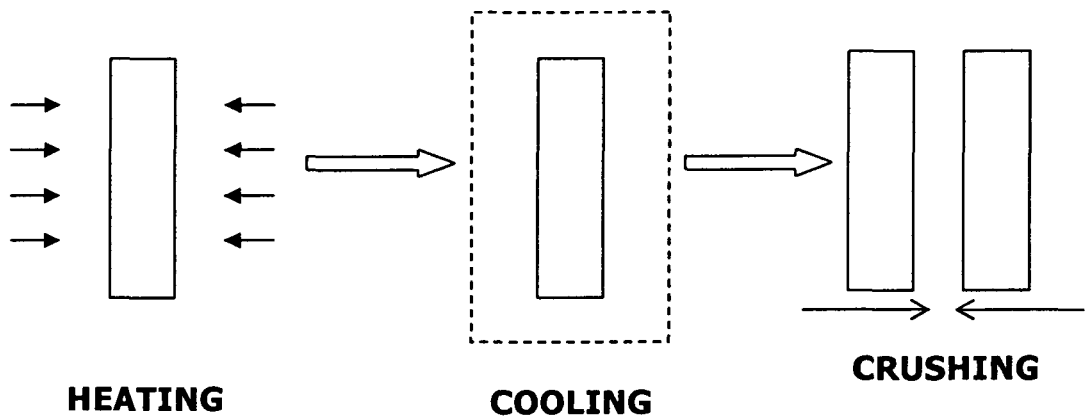
FIG. 3 is a flow chart showing the details of the crushing step in FIG. 2.

In this step, the selected scrap silicon (referred to below as "raw material silicon") is crushed to a size suitable for the subsequent melting step. FIG. 3 shows the details of the crushing step. First, raw material silicon is heated by a method such as heating using a gas burner, heating using an electric furnace, or high frequency heating, and then it is rapidly cooled by water cooling or air cooling. Of the above-described heating methods, it is particularly preferable to use high frequency heating because this method can prevent contamination during heating and uses relatively simple equipment. Heating of the raw material silicon is carried out on refractory bricks or silicon oxide to prevent adhesion of metal impurities to the raw material silicon. As a result of the above-described heating and cooling steps, the raw material silicon becomes brittle and easy to crush. Then, pieces of raw material silicon are struck against each other and crushed. When this crushing is carried out by hand, pieces of the raw material silicon are held in both hands above a tray made of a plastic such as polyethylene and are struck against each other to perform crushing. The crushed raw material silicon (referred to below as "granular scrap silicon") is collected in the tray. Since the tray is made of plastic, it does not contain any metallic impurities that could adhere to the granular scrap silicon during crushing. This crushing step may also be carried out by a crusher which performs the same operation as that performed by manual crushing. An example of a suitable method of performing crushing is disclosed in U.S. patent application Ser. No. 10/954,350 entitled "Method of Crushing Silicon Blocks", the disclosure of which is incorporated by reference.

Melting Step

The granular scrap silicon which is obtained by the above-described crushing step is placed into a hearth disposed in a vacuum vessel reduced to a pressure of $10^{-4}$ torr or less. The granular scrap silicon is then irradiated with an electron beam to melt it and obtain molten silicon (referred to below as a "melt") heated to a temperature of at least 1500° C., for example.

Solidification Step

The melt is then poured into a water-cooled crucible disposed next to the hearth and cooled.

Next, an example of a refining apparatus which can be used in the above-described embodiment of a refining method will be described.

Figure 4:
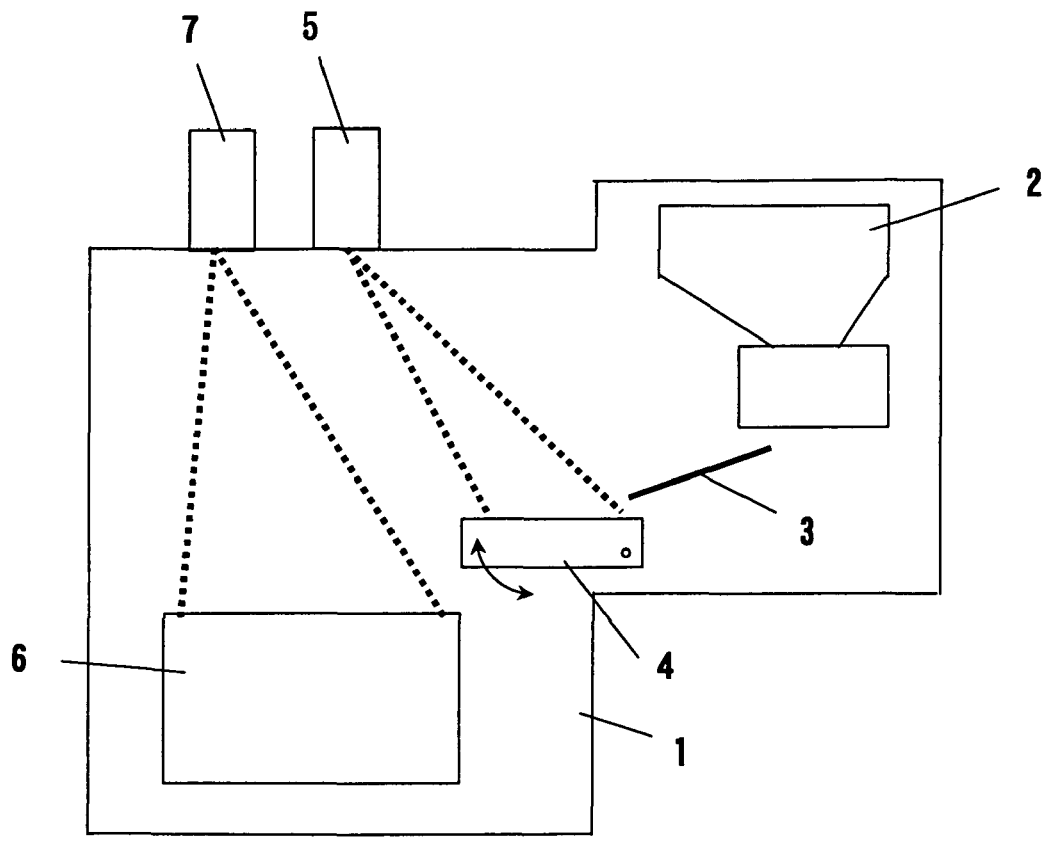
FIG. 4 is a schematic elevation showing the overall structure of an embodiment of a refining apparatus which can be used in a recycling method according to the present invention.

FIG. 4 is a schematic elevation of the overall structure of the refining apparatus. As shown in this figure, the refining apparatus includes a vacuum vessel 1, a raw material supply apparatus 2 installed inside the vacuum vessel 1, a hearth 4 which receives granular scrap silicon from the raw material supply apparatus 2 via a chute 3, an electron gun 5 which irradiates the granular scrap silicon inside the hearth 4 with an electron beam and melts it, a crucible 6 to which the resulting melt is supplied from the hearth 4, and an electron gun 7 which irradiates the melt within the crucible 6 with an electron beam. The raw material supply apparatus 2 comprises a commercially available vibratory parts feeder (e.g., a JA-type bulk hopper of SANKI Co., Ltd.) modified for use in a high-temperature vacuum. The modifications include, for example, replacement of parts made of iron with parts made of stainless steel in order to prevent formation of rust in the high-temperature vacuum, and replacement of ordinary grease with grease for use in a vacuum. Examples of other types of mechanisms which can be used for the raw material supply apparatus 2 instead of a vibratory parts feeder are a combination of a hopper and a screw feeder, a combination of a hopper and a gate mechanism, a combination of a container and a manipulator, and a combination of a container and a conveyer.

The structure of an example of a refining apparatus which can be used in the present invention is disclosed in greater detail in U.S. patent application Ser. No. 11/142,658 by Yamauchi et al. entitled "Refining Apparatus for Scrap Silicon Using an Electron Beam", now U.S. Pat. No. 7,687,019, the disclosure of which is incorporated by reference.

First, a hopper of the raw material supply apparatus 2 is filled with the granular scrap silicon which is obtained in the above-described crushing step. When the raw material supply apparatus 2 is operated, the granular scrap silicon within the hopper is discharged onto the chute 3 at a prescribed speed and is supplied to the hearth 4 by the chute 3. When a prescribed amount of the granular scrap silicon has been supplied to the hearth 4, electron gun 5 is operated, and the granular scrap silicon within the hearth 4 is irradiated with an electron beam and melted to obtain a melt having a prescribed temperature. When scrap silicon containing only antimony (which has a high vapor pressure in a vacuum) as a dopant is refined, the impurity element vaporizes within a short period of time in the melting step, and a silicon melt of high purity is obtained. The hearth 4 is tilted about a pivot shaft by an unillustrated actuator, so that the melt is poured from the hearth 4 into the crucible 6. Before the melt within the crucible 6 solidifies, electron gun 7 installed above crucible 6 is operated, and the melt within the crucible 6 is irradiated with an electron beam to perform further vaporization of impurity elements contained in the melt. The melt within the crucible 6 is then cooled, and a lump of silicon of high purity is obtained. When the required purity of silicon is low, the step of irradiating the melt within the crucible 6 with an electron beam from electron gun 7 may be omitted.

A recycling method according to the present invention enables recycling to be profitably carried out as a business. The method can manufacture high-purity silicon from scrap silicon which contains impurity elements and which is produced during the manufacture of silicon products such as silicon wafers.

What is claimed is:

1. A method of recycling scrap silicon produced during the manufacture of a silicon product from a silicon ingot comprising:
   selecting scrap silicon for which the expected sale price of a resultin silicon product exceeds the total of the purchase price and the refining cost of the scrap silicon,
   recovering the selected scrap silicon by purchasing lumps of scrap silicon produced during the manufacture of a silicon product from a silicon ingot, measuring the electrical resistivity of the purchased lumps of scrap silicon, and selecting from the purchased lumps of scrap silicon, based on the measured electrical resistivity, lumps of n-type scrap silicon which are each made of the selected scrap silicon and which each contain as a dopant only the same specific impurity element; and
   refining the recovered scrap silicon to reduce the level of the specific impurity element in the recovered scrap silicon and obtain a silicon product which can be sold as a silicon material by crushing the selected lumps of scrap silicon, placing the crushed silicon into a vacuum vessel, irradiating the crushed silicon which was placed into the vacuum vessel with an electron beam to melt it and vaporize at least a portion of the specific impurity element, and solidifying the resulting molten silicon.

2. A method as claimed in claim 1 wherein the selected scrap silicon contains antimony as a dopant.

3. A method as claimed in claim 1 wherein the selected scrap silicon contains arsenic as a dopant.

4. A method as claimed in claim 1 wherein the selected scrap silicon contains antimony, arsenic, or phosphorus as a dopant.

5. A method as claimed in claim 1 including refining the recovered scrap silicon to a purity of 99.999%.

* * * * *